US011162215B2

(12) United States Patent
Inagaki et al.

(10) Patent No.: US 11,162,215 B2
(45) Date of Patent: Nov. 2, 2021

(54) DEFIBRATION TREATMENT APPARATUS AND FIBER PROCESSING APPARATUS

(71) Applicant: SEIKO EPSON CORPORATION, Tokyo (JP)

(72) Inventors: Yuta Inagaki, Nagano (JP); Naoko Omagari, Nagano (JP); Masahide Nakamura, Nagano (JP); Keigo Yamasaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/822,158

(22) Filed: Mar. 18, 2020

(65) Prior Publication Data

US 2020/0299898 A1    Sep. 24, 2020

(30) Foreign Application Priority Data

Mar. 20, 2019 (JP) .................................. 2019-053841
Nov. 12, 2019 (JP) .................................. 2019-204504

(51) Int. Cl.
*D21F 9/04* (2006.01)
*D21B 1/08* (2006.01)
*D04H 1/732* (2012.01)

(52) U.S. Cl.
CPC ............... *D21B 1/08* (2013.01); *D04H 1/732* (2013.01); *D21F 9/04* (2013.01)

(58) Field of Classification Search
USPC ....................................................... 162/261
See application file for complete search history.

(56) References Cited

U.S. PATENT DOCUMENTS

| 3,409,132 | A  | * | 11/1968 | Meadows ................ D21D 5/16 |
| | | | | 209/273 |
| 4,848,682 | A  | * | 7/1989  | Scheier .................. B02C 13/06 |
| | | | | 241/190 |
| 8,313,616 | B2 | * | 11/2012 | Tamai ...................... D21F 9/02 |
| | | | | 162/348 |
| 8,882,965 | B2 | * | 11/2014 | Yamagami ............... D21F 9/02 |
| | | | | 162/261 |
| 9,422,664 | B2 | * | 8/2016  | Higuchi ................. B02C 18/141 |
| 9,428,859 | B2 | * | 8/2016  | Higuchi ................. B02C 18/141 |
| 9,643,339 | B2 |   | 5/2017  | Higuchi et al. |
| 2015/0096701 | A1 | * | 4/2015 | Higuchi .................... D21D 5/18 |
| | | | | 162/261 |

FOREIGN PATENT DOCUMENTS

JP    2015-074848 A    4/2015

* cited by examiner

*Primary Examiner* — Mark Halpern
(74) *Attorney, Agent, or Firm* — Global IP Counselors, LLP (57) ABSTRACT

A defibration treatment apparatus including a feeding hole through which a material is fed, a rotator that rotates about a rotational central axis, a fixed member that covers at least a portion of the rotator, and a discharge opening that discharges a defibrated object obtained by defibrating the material between the rotator and the fixed member. In the defibration treatment apparatus, the rotator includes a plurality of rotary blades that extend in directions away from the rotational central axis, at least a portion of the fixed member is configured of a screen including a plurality of openings, the screen is disposed at a position corresponding to an outer rotational circumference of the rotator, and a discharge path in communication with the discharge opening is provided along the screen and on a side opposite the rotator with respect to the screen.

5 Claims, 7 Drawing Sheets

DEFIBRATION TREATMENT APPARATUS AND FIBER PROCESSING APPARATUS

The present application is based on, and claims priority from JP Application Serial Number 2019-053841, filed Mar. 20, 2019 and JP Application Serial Number 2019-204504, filed Nov. 12, 2019, the disclosures of which are hereby incorporated by reference herein in their entirety.

BACKGROUND

1. Technical Field

The present disclosure relates to a defibration treatment apparatus and a fiber processing apparatus.

2. Related Art

Hitherto, in a defibration treatment apparatus and a fiber processing apparatus, a material is introduced through an introduction opening and is discharged through a discharge opening after the material has been defibrated between inner blades provided on an outer circumference of a rotator, and outer blades provided on an inner circumference of a fixed member. For example, in JP-A-2015-74848, defibration is performed by inner blades of a rotator disposed between an introduction opening and a discharge opening in a rotation shaft direction, and outer blades of a fixed member that covers the rotator in the entire rotation shaft direction.

In the technique described in JP-A-2015-74848, there is an issue in that defibrated objects do not totally pass through between the rotator and the fixed member and stagnate on the discharge opening side.

SUMMARY

An aspect overcoming the above issue is a defibration treatment apparatus including a feeding hole through which a material is fed, a rotator that rotates about a rotational central axis, a fixed member that covers at least a portion of the rotator, and a discharge opening that discharges a defibrated object obtained by defibrating the material between the rotator and the fixed member, in which the rotator includes a plurality of rotary blades that extend in directions away from the rotational central axis, in which at least a portion of the fixed member is configured of a screen including a plurality of openings, in which the screen is disposed at a position corresponding to an outer rotational circumference of the rotator, and in which a discharge path in communication with the discharge opening is provided along the screen and on a side opposite the rotator with respect to the screen.

In the above-described defibration treatment apparatus, a cross-sectional area of the discharge path at a first position that is close to the discharge opening may be larger than a cross-sectional area of the discharge path at a second position that is farther away from the discharge opening than the first position.

In the above-described defibration treatment apparatus, the discharge path may be, at a position away from the discharge opening, coupled to an air suction path configured to take in a gas.

In the above-described defibration treatment apparatus, an air sending device that sends a gas from the discharge path to the air suction path may be coupled to the discharge path.

Another aspect overcoming the above issue is a fiber processing apparatus including the defibration treatment apparatus according to the above, and a processing portion that processes a defibrated object defibrated in the defibration treatment apparatus.

DESCRIPTION OF EXEMPLARY EMBODIMENTS

Hereinafter, preferred exemplary embodiments of the present disclosure will be described in detail with reference to the drawings. Note that the exemplary embodiments described hereinafter do not limit the subject matter of the present disclosure stipulated in the claims. Furthermore, the components described hereinafter are not necessarily the essential constituent features of the present disclosure.

Figure 1:
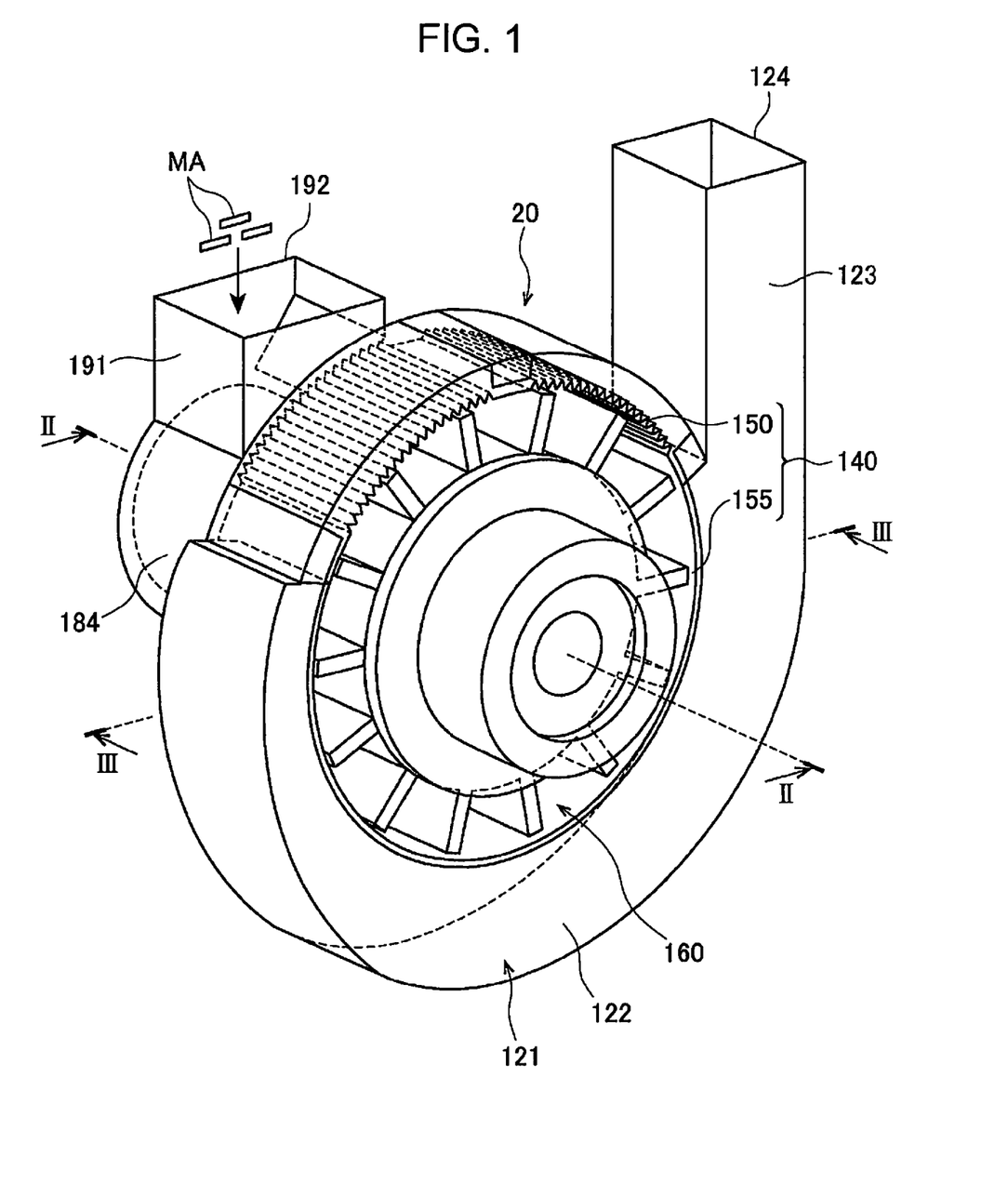
FIG. 1 is a perspective view of a defibration treatment apparatus.
Figure 2:
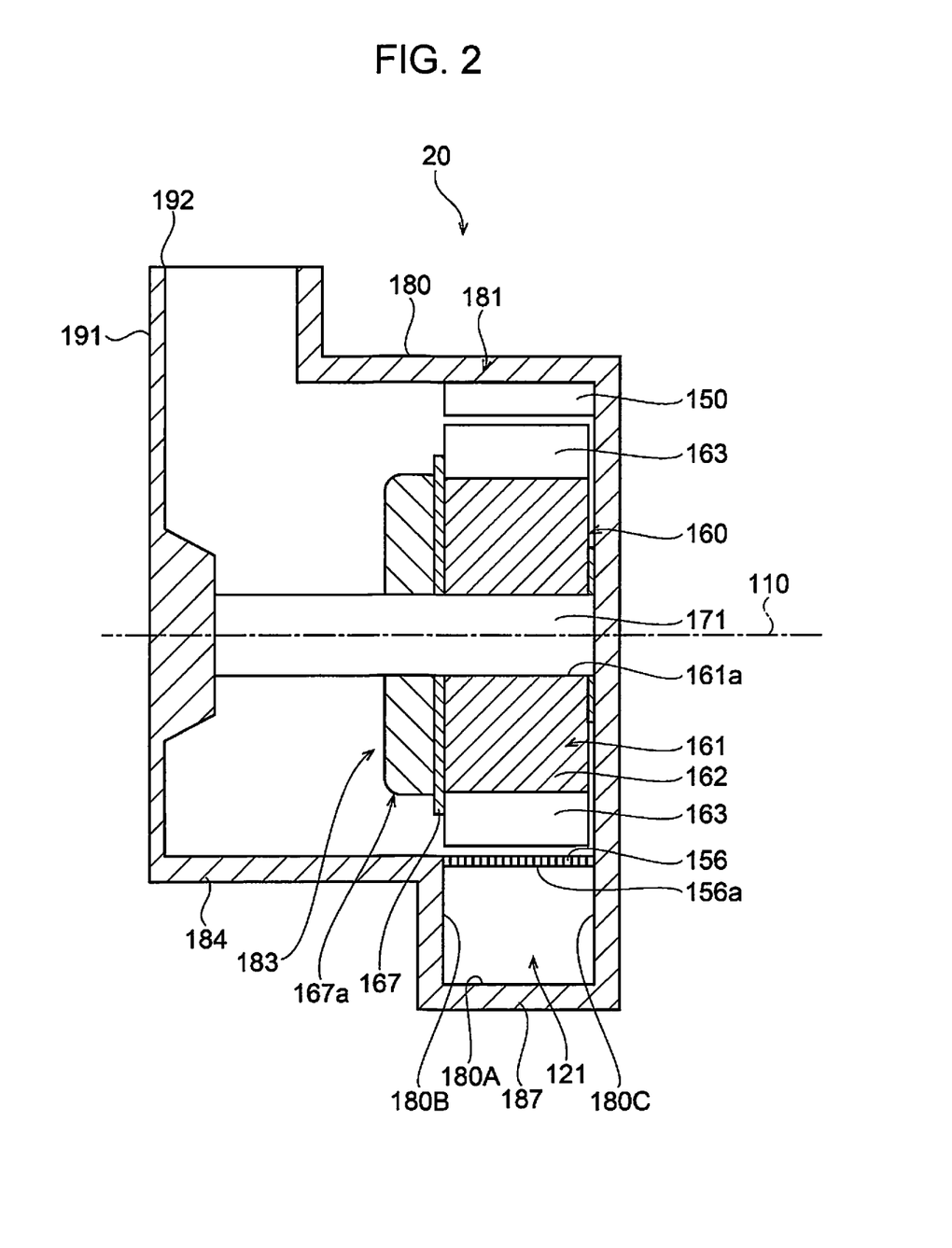
FIG. 2 is a cross-sectional view taken along line II-II in FIG. 1.
Figure 3:
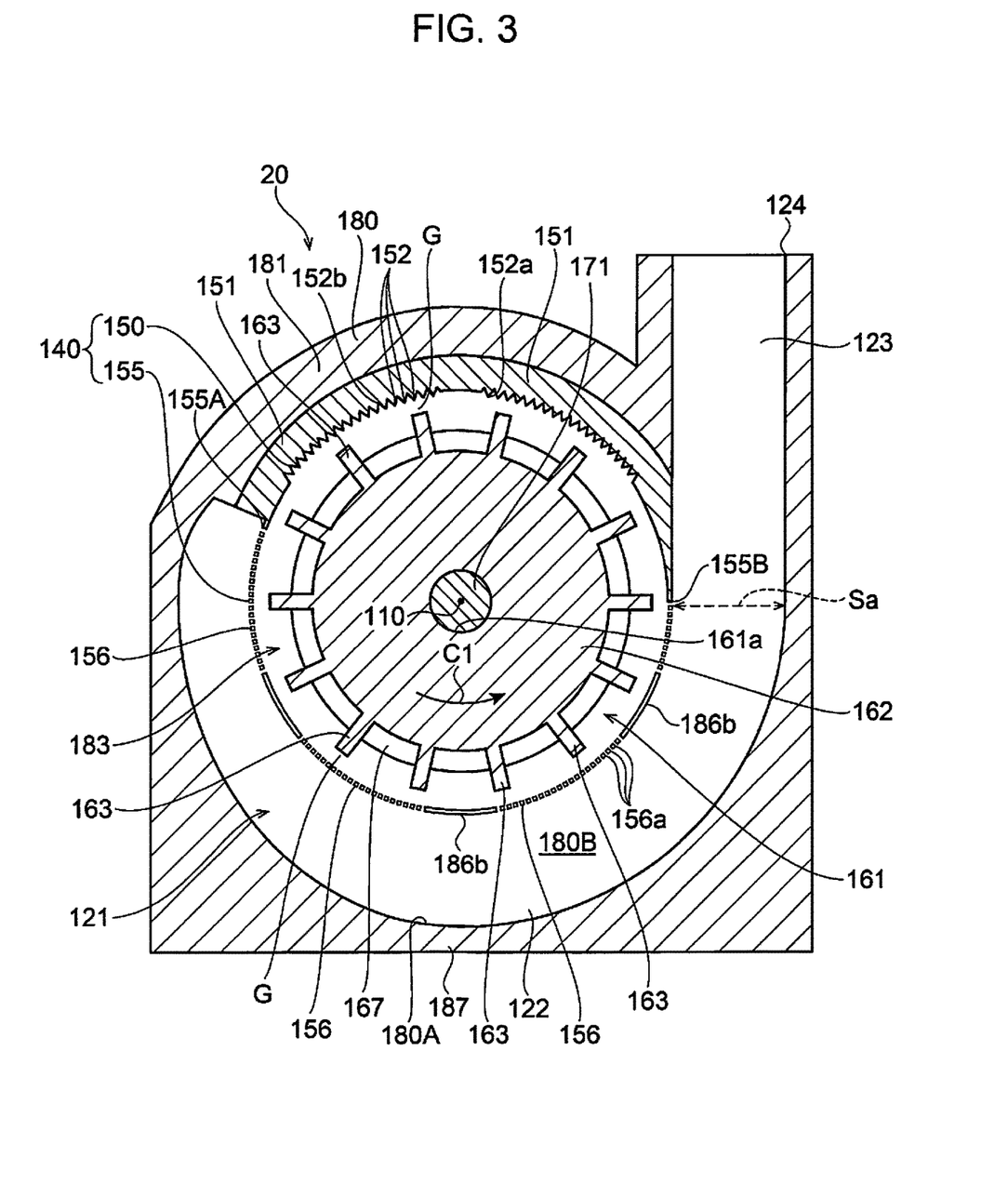
FIG. 3 is a cross-sectional view taken along line III-III in FIG. 1.

1. First Exemplary Embodiment 1-1. Configuration of Defibration Treatment Apparatus FIG. 1 is a perspective view of a defibration treatment apparatus 20. FIG. 2 is a cross-sectional view taken along line II-II in FIG. 1. FIG. 3 is a cross-sectional view taken along line III-III in FIG. 1. The defibration treatment apparatus 20 is an apparatus that performs a treatment in which a material MA in which a plurality of fibers are bound together is unbound into a single or a few fibers. The defibration treatment apparatus 20 is a dry defibration treatment apparatus that performs processes such as defibration in gas, such as the atmosphere or air, rather than in liquid.

The defibration treatment apparatus 20 according to the present exemplary embodiment includes a rotationally driven rotator 160 and a fixed member 140 that covers the surroundings of the rotator 160. The defibration treatment apparatus 20 further includes a housing 180 that covers and houses the rotator 160 and the fixed member 140. In FIG. 1, illustration of the housing 180 is omitted and an internal structure of the defibration treatment apparatus 20 is illustrated.

A configuration in which a rotation shaft 171 extends in the horizontal direction will be described in the present exemplary embodiment. However, the rotation shaft 171 of the rotator 160 may be configured to extend in the gravitational direction. Alternatively, the rotation shaft 171 may be configured to extend in any direction and rotate thereat. In the following description, the direction in which the rotation shaft 171 extends will be referred to as an axial direction. Furthermore, a center of a rotator shape, such as the rotator 160, in the radial direction will be referred to as a shaft center 110.

The housing 180 includes a cylindrically shaped body portion 181. A defibration chamber 183 is formed by an internal space of the body portion 181.

A cylindrical portion 184 that extends in the axial direction is formed on one end side of the body portion 181 in the axial direction. An inner portion of the cylindrical portion 184 is in communication with the defibration chamber 183. An inlet pipe portion 191 is formed in the upper portion of the cylindrical portion 184. The upper portion corresponds to an example of a direction that intersects the axial direction. An internal space of the inlet pipe portion 191 is in communication with the defibration chamber 183 through the cylindrical portion 184. A feeding hole 192 that is open upwards is formed at an upper end of the inlet pipe portion 191. The material MA fed through the feeding hole 192 moves to the defibration chamber 183 through the inlet pipe portion 191.

The rotator 160 is disposed in the defibration chamber 183 of the housing 180. The rotator 160 includes the rotation shaft 171 that extends in the horizontal direction and a rotator body 161 that is fixed to and supported by the rotation shaft 171.

As illustrated in FIGS. 2 and 3, the rotator body 161 includes a columnar base portion 162 through which the rotation shaft 171 is inserted, and defibration inner blades 163 that radially protrude from an outer circumference side of the base portion 162. Each defibration inner blade 163 is configured of a plate-shaped protrusion extending in the axial direction. A plurality of defibration inner blades 163 are formed in the circumferential direction with gaps in between. The defibration inner blades 163 correspond to an example of a plurality of rotary blades that protrude in directions extending away from the rotation shaft 171. A shaft hole 161a is formed in the center of the rotator body 161.

A vane plate 167 is attached to the feeding hole 192 side of the rotator 160 in the axial direction. A plurality of vanes 167a are provided on a surface of the vane plate 167 on the inlet pipe portion 191 side. The vanes 167a function, at the least, to move the material MA from the inlet pipe portion 191 side towards the other end side in the axial direction when the rotator 160 is rotated.

The rotator 160 includes the rotation shaft 171, the rotator body 161, and the vane plate 167. Note that while the rotator body 161 has been described as an integrally formed block, the rotator body 161 may be configured of plates stacked on each other.

The rotation shaft 171 of the rotator 160 is rotatably supported by the housing 180.

The rotation shaft 171 is rotationally driven by a drive mechanism (not shown). In the present exemplary embodiment, the drive mechanism is configured of a belt and a pulley, and the rotation shaft 171 is driven by having motive power from a rotary drive source (not shown) transmitted to the belt and the pulley. Note that the configuration that rotationally drives the rotation shaft 171 does not have to be configured of a belt and a pulley. The rotation shaft 171 is configured to rotate in a rotation direction illustrated by an arrow C1 in FIG. 3.

The fixed member 140 is disposed on the outer side of the rotator 160 in the radial direction so as to cover an outer circumference of the rotator 160. The fixed member 140 is supported by the housing 180. The fixed member 140 is a member configured in a cylindrical manner extending along an outer rotational circumference of the rotator 160. The fixed member 140 is disposed in a concentric manner so as to surround the rotator 160 and form a gap G (see FIG. 3) around the rotator 160.

The fixed member 140 of the present exemplary embodiment includes a fixed outer blade 150 and a screen 155 that are provided in the circumferential direction. The fixed outer blade 150 corresponds to an example of a fixed blade.

As illustrated in FIG. 3, the fixed outer blade 150 is disposed in a portion of the housing 180. Defibration outer blades 152 that protrude in the radial direction in a mountainous shape are formed on an inner circumferential portion of a block portion 151. The defibration outer blades 152 are formed at equal intervals in the circumferential direction. The defibration outer blades 152 form a protruding and recessed shape in the circumferential direction. In the defibration outer blades 152, apex portions 152a and valley portions 152b extend in the axial direction in a stripe like manner.

The screen 155 is configured of metal plate materials 156, for example. In other words, the screen 155 is configured of the plate materials 156 combined in the rotation direction C1 of the rotator 160. The plate materials 156 are fixed with frames 186b. A plurality of openings are formed in each plate material 156 by a method such as, for example, punching, etching, or cutting. Furthermore, the plate material 156 may be a mesh formed by weaving wires.

A plurality of circular hole-shaped classification holes 156a that penetrate the plate material 156 in the thickness direction are formed.

The fixed member 140 is configured of the fixed outer blade 150 and the screen 155 combined in the rotation direction of the rotator 160. The fixed member 140 corresponds to an example of a connection body.

A discharge path 121 is formed on the outer side of the plate material 156 in the radial direction. The discharge path 121 is a hollow hole. The discharge path 121 includes a bent portion 122 that extends along an outer circumferential portion of the screen 155. A rectilinear portion 123 that extends from the fixed member 140 is formed downstream of the bent portion 122 in the rotation direction C1. A downstream end of the rectilinear portion 123 is open to the outside. In other words, a discharge opening 124 corresponding to the downstream end of the rectilinear portion 123 is formed in the housing 180.

In the housing 180, a diameter enlarged portion 187 is formed on the outer side of the body portion 181 in the radial direction. In other words, the discharge path 121 serving as a space is formed on the outer circumferential side of the fixed member 140 by separating the body portion 181 of the housing 180 and the internal space of the diameter enlarged portion 187 from each other with the fixed member 140.

The housing 180 includes, in the diameter enlarged portion 187, an inner wall surface 180A and lateral-wall inner wall surfaces 180B and 180C that stand up from both ends of the inner wall surface 180A in the width direction or both ends of the inner wall surface 180A in the axial direction.

In the present exemplary embodiment, the inner wall surface 180A is formed so that the distance from the screen 155 becomes larger as the inner wall surface 180A extends in the rotation direction of the rotator 160. Accordingly, the bent portion 122 of the discharge path 121 is formed so that a cross-sectional area Sa of the discharge path 121 becomes larger as the discharge path 121 extends downstream in the rotation direction C1. In the present exemplary embodiment, the cross-sectional area Sa is an area of a cross section taken in a direction normal to the screen 155.

The discharge path 121 is in communication with a space inside the fixed member 140 through the classification holes 156a of the plate materials 156. A defibrated object that has been defibrated by the fixed member 140 and the rotator 160 can be discharged into the discharge path 121 through the plurality of classification holes 156a of the screen 155 that are provided in the axial direction.

1-2. Operation of Defibration Treatment Apparatus

An operation of the defibration treatment apparatus 20 will be described next. The defibration treatment apparatus 20 performs a dry defibration treatment on the material MA by rotating the rotator 160 by rotating the rotation shaft 171, and by guiding the material MA through the gap G between the rotator 160 and the fixed member 140 with airflow.

In the present exemplary embodiment, the material MA fed through the feeding hole 192 of the defibration treatment apparatus 20 is introduced into an inner portion of the housing 180 through the inlet pipe portion 191. The rotator 160 is rotated in the inner portion of the housing 180, and the material MA is sent to the gap G between the defibration inner blades 163 of the rotator 160 and the fixed member 140. The material MA that has been sent into the gap G and that has received centrifugal force from the rotator 160 flies through the gap G, impinges on the fixed member 140, is unbound, and becomes defibrated.

A configuration in which the rotator is disposed between the introduction opening and the discharge opening in the axial direction and in which the defibration outer blades of the fixed member are disposed and formed so as to cover the outer circumferences of the defibration inner blades of the rotator in the entire rotation shaft direction can be conceived. In such a configuration, the airflow created by the rotation of the rotator impinges on the inner surfaces of the defibration outer blades and becomes diffused, and the airflow in the defibration outer blades tends to become stagnated; accordingly, the defibrated object tends to become stagnated on the discharge opening side in a portion between the rotator and the fixed member.

Conversely, in the present exemplary embodiment, the screen 155 is provided in the outer circumferential direction of the rotator 160. Furthermore, the discharge path 121 is provided on a side opposite the rotator 160 with respect to the screen 155. Accordingly, the airflow easily flows to the discharge path 121 through the classification holes 156a of the screen 155 and the airflow between the fixed member 140 and the rotator 160 becomes stabilized easily. Due to the above, the defibrated object on the stable airflow easily passes through the classification holes 156a and stagnation of the defibrated object between the fixed member 140 and the rotator 160 is suppressed.

In the bent portion 122 of the discharge path 121, the cross-sectional area Sa on the discharge opening 124 side is larger than that of the upstream portion. Note that since the airflow and the defibrated object can enter the discharge path 121 sequentially from the upstream portion across to the downstream portion, when the cross-sectional area Sa is small in the downstream portion of the discharge path 121, there are cases in which the pressure in the discharge path 121 becomes excessively high. As a result, the flow rate of the airflow passing through the classification holes 156a in the upstream portion tends to decrease, and the defibrated object tends to stagnate in the upstream portion between the fixed member 140 and the rotator 160. Conversely, in the present exemplary embodiment, the cross-sectional area Sa becomes larger as the bent portion 122 of the discharge path 121 extends downstream and the velocity of the airflow can be obtained in the upstream portion between the fixed member 140 and the rotator 160; accordingly, discharge of the defibrated object through the fixed member 140 is facilitated.

As described above, the defibration treatment apparatus 20 of the present exemplary embodiment includes the feeding hole 192 through which the material MA is fed, the rotator 160 that rotates about the rotation shaft 171, and the fixed member 140 that covers the rotator 160. The defibration treatment apparatus 20 further includes the discharge opening 124 through which the defibrated object obtained by defibrating the material MA between the rotator 160 and the fixed member 140 is discharged. In the above defibration treatment apparatus 20, the rotator 160 includes the plurality of defibration inner blades 163 that protrude in directions extending away from the rotation shaft 171. Furthermore, at least a portion of the fixed member 140 is configured of the screen 155 including the plurality of classification holes 156a. The screen 155 is disposed at a position corresponding to the outer rotational circumference of the rotator 160. Furthermore, the discharge path 121 that is in communication with the discharge opening 124 is provided along the screen 155 and on a side opposite the rotator 160 with respect to the screen 155. Accordingly, since the discharge path 121 is provided downstream in the rotation direction C1 of the defibration inner blades 163, the airflow does not become stagnated and the airflow can be oriented towards the discharge opening 124. Accordingly, stagnation of the defibrated object between the rotator 160 and the fixed member 140 can be suppressed.

Furthermore, in the present exemplary embodiment, the discharge path 121 is shaped so that the cross-sectional area Sa thereof at a downstream position that is near the discharge opening 124 is larger than the cross-sectional area Sa thereof at an upstream position that is farther away from the discharge opening 124 than the downstream position. Note that in the discharge path 121, the airflow from inside the fixed member 140 tends to have a smaller flow rate in a portion upstream in the rotation direction C1 of the defibration inner blades 163. However, in the present exemplary embodiment, by reducing the cross-sectional area Sa of the discharge path 121, the velocity of the airflow in the discharge path 121 becomes faster, which facilitates the discharge of the defibrated object from inside the fixed member 140.

2. Second Exemplary Embodiment 2-1. Configuration of Defibration Treatment Apparatus A second exemplary embodiment of the present disclosure will be described next. Note that portions that are the same as the first exemplary embodiment described above are attached with the same reference numerals and descriptions thereof are omitted.

Figure 4:
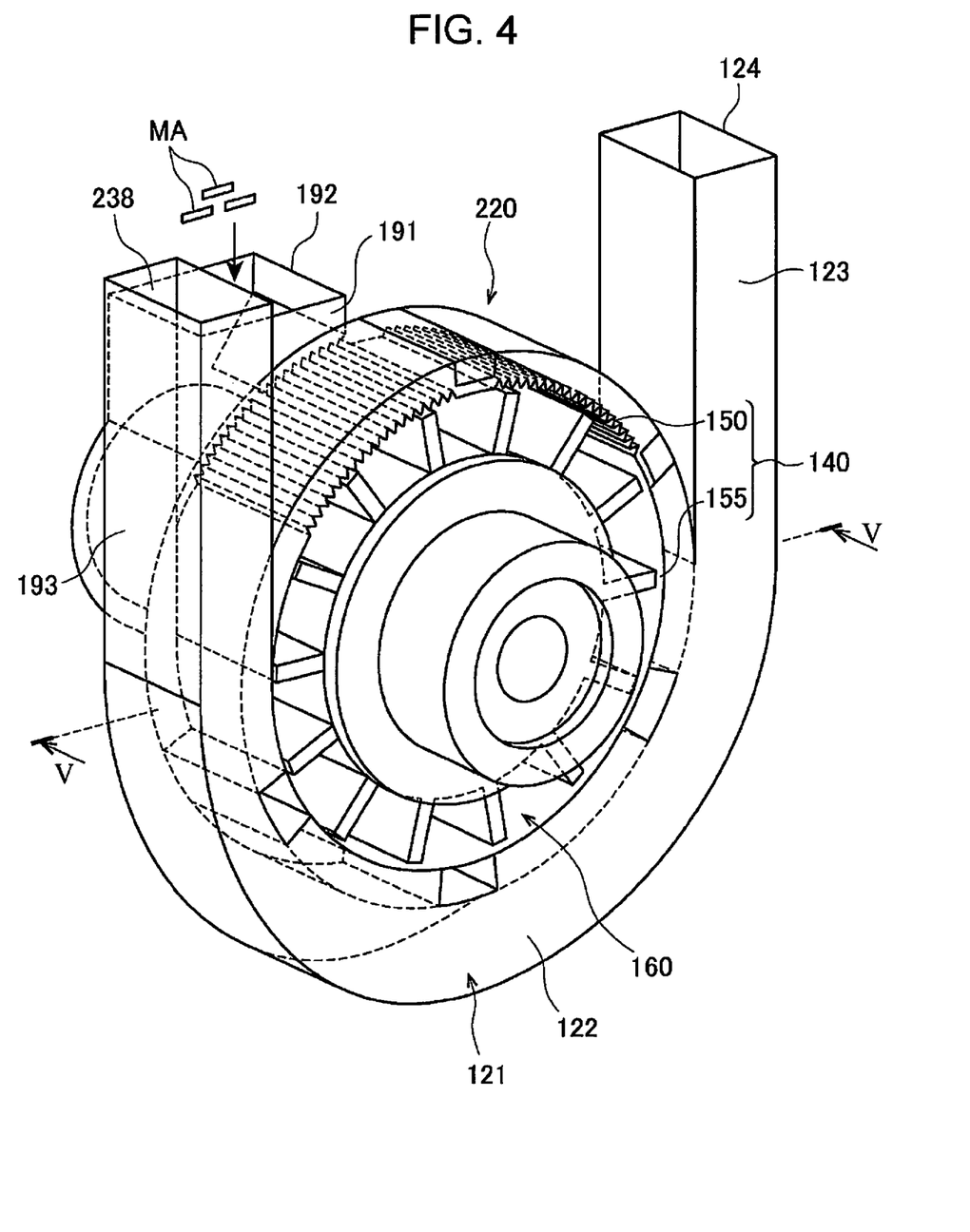
FIG. 4 is a perspective view of a defibration treatment apparatus of a second exemplary embodiment.
Figure 5:
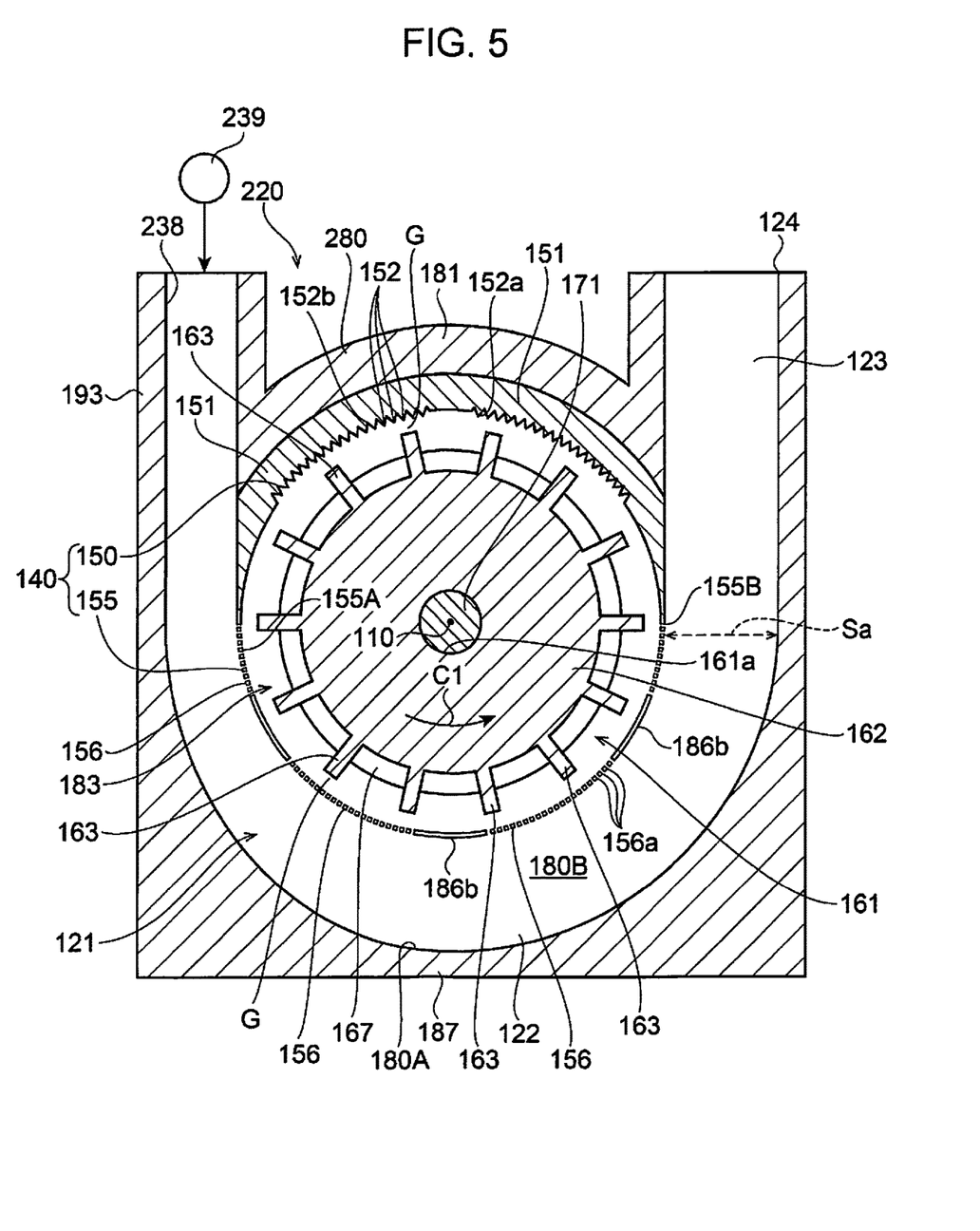
FIG. 5 is a cross-sectional view taken along line V-V in FIG. 4.

FIG. 4 is a perspective view of a defibration treatment apparatus 220 of the second exemplary embodiment. FIG. 5 is a cross-sectional view of a portion including the discharge path 121 and the rotator 160 in FIG. 4 taken along the rotation direction of the rotator 160 (a cross-sectional view taken along line V-V). Note that FIG. 4 corresponds to FIG. 1 of the first exemplary embodiment, and FIG. 5 corresponds to FIG. 3 of the first exemplary embodiment. The defibration treatment apparatus 220 of the second exemplary embodiment includes a housing 280 that includes, other than the discharge path 121 and the discharge opening 124 included in the housing 180 of the first exemplary embodiment, an air suction path 238. The housing 280 of the second exemplary embodiment includes a suction air introducing pipe portion 193 at a position corresponding to an upstream end of the discharge path 121. An internal space of the suction air introducing pipe portion 193 is in communication with an upstream portion of the discharge path 121. The air suction path 238 is formed by the internal space of the suction air introducing pipe portion 193. A blower 239 is coupled to the air suction path 238. The blower 239 sends a gas from the air suction path 238 to the discharge path 121. The blower 239 corresponds to an example of an air sending device.

2-2. Operation of Defibration Treatment Apparatus

The defibration treatment apparatus 220 of the second exemplary embodiment also has a configuration similar to that of the first exemplary embodiment. Since the discharge path 121 is provided downstream in the rotation direction C1 of the defibration inner blades 163, the airflow does not become stagnated and the airflow can be oriented towards the discharge opening 124. Accordingly, stagnation of the defibrated object can be suppressed.

Furthermore, in the present exemplary embodiment, the air suction path 238 is coupled to the upstream end of the discharge path 121, and the blower 239 is coupled to the air suction path 238. Accordingly, a gas can be sent from the air suction path 238 to the discharge path 121 with the blower 239, and the flow velocity of the gas flowing towards the discharge opening 124 of the discharge path 121 can be increased. Accordingly, a discharge efficiency of the defibrated object in the discharge path 121 to the discharge opening 124 can be increased.

As described above, in the defibration treatment apparatus 220 of the present exemplary embodiment, similar to the first exemplary embodiment, the rotator 160 includes the plurality of defibration inner blades 163 that protrude in directions extending away from the rotation shaft 171. Furthermore, at least a portion of the fixed member 140 is configured of the screen 155 including the plurality of classification holes 156a. The screen 155 is disposed at a position corresponding to the outer rotational circumference of the rotator 160. Furthermore, the discharge path 121 that is in communication with the discharge opening 124 is provided along the screen 155 and on a side opposite the rotator 160 with respect to the screen 155. Accordingly, in the present exemplary embodiment as well, similar to the first exemplary embodiment, stagnation of the defibrated object between the rotator 160 and the fixed member 140 can be suppressed.

Furthermore, in the present exemplary embodiment, the discharge path 121 is, at a position away from the discharge opening 124, coupled to the air suction path 238 through which the gas can be taken in. Accordingly, depending on the gas that is taken in, the flow velocity of the gas in the discharge path 121 can be increased. Accordingly, a discharge efficiency of the defibrated object in the discharge path 121 to the discharge opening 124 can be increased.

Furthermore, in the present exemplary embodiment, the blower 239 that sends a gas from the air suction path 238 to the discharge path 121 is coupled to the air suction path 238. Accordingly, since the gas is actively sent from the air suction path 238 into the discharge path 121, the flow velocity of the gas in the discharge path 121 can be increased further. Accordingly, a discharge efficiency of the defibrated object in the discharge path 121 to the discharge opening 124 can be increased.

Note that in the discharge path 121 of the present exemplary embodiment, the cross-sectional area Sa at a downstream position that is near the discharge opening 124 is larger than the cross-sectional area Sa at an upstream position that is farther away from the discharge opening 124 than the downstream position. Accordingly, similar to the first exemplary embodiment, by reducing the cross-sectional area Sa of the discharge path 121 in the upstream portion, the velocity of the airflow in the upstream portion of the discharge path 121 becomes fast, which facilitates the discharge of the defibrated object.

3. Third Exemplary Embodiment 3-1. Configuration of Defibration Treatment Apparatus A third exemplary embodiment of the present disclosure will be described next. Note that portions that are the same as the first exemplary embodiment described above are attached with the same reference numerals and descriptions thereof are omitted.

Figure 6:
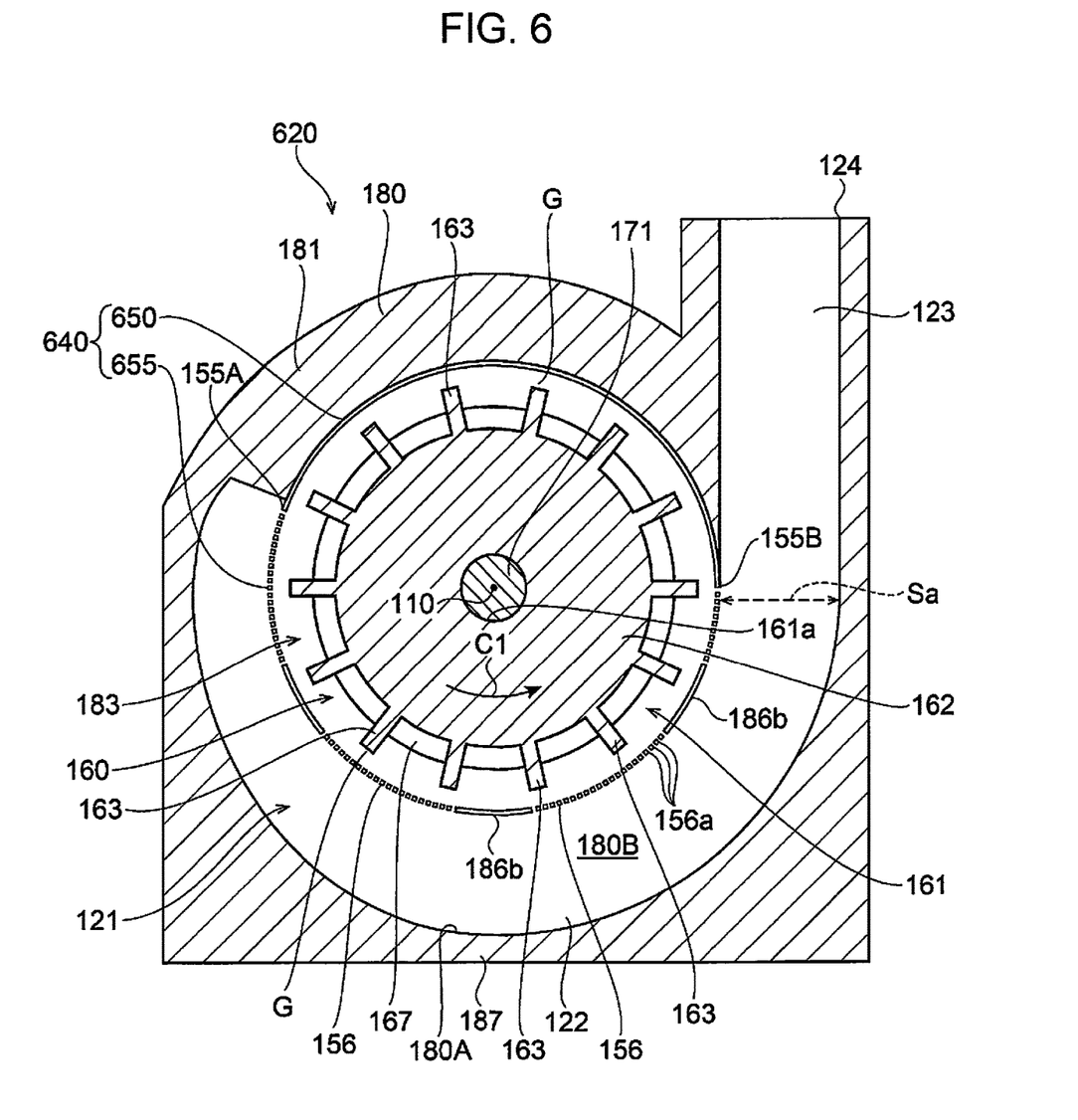
FIG. 6 is a cross-sectional view of a defibration treatment apparatus of a third exemplary embodiment.

FIG. 6 is a cross-sectional view of a defibration treatment apparatus 620 of the third exemplary embodiment. The defibration treatment apparatus 620 includes a fixed member 640. The fixed member 640 of the present exemplary embodiment includes a screen 655 and a plate 650 that are provided in the circumferential direction of the rotator 160. In other words, the fixed member 640 is a drum configured in a columnar manner with a single or a plurality of plate materials, and includes a screen area (hereinafter, a first area) in which the plurality of classification holes (openings) 156a are provided and a plate 650 area (hereinafter, a second area) in which the classification holes (openings) 156a are not provided. Furthermore, in a cross-sectional view of the defibration treatment apparatus 620 of the third exemplary embodiment that is taken in a direction in which the material MA is fed and that includes the shaft center 110, the configuration is similar to that in FIG. 2 described above other than that the fixed outer blade 150 is replaced with the plate 650.

In the first area of the fixed member 640, the screen 655 configured of a metal plate material 156, for example, is provided and, in a similar manner, a metal plate 650, for example, is provided in the second area of the fixed member 640. The plate 650 is disposed on an upper portion of the fixed member 640. While the plate 650 is integrally assembled with the screen 655 in a columnar manner, the plate 650 is configured so that no classification holes 156a is formed. Furthermore, the screen 655 is disposed at least at a portion corresponding to where the discharge path 121 is provided. The material MA can be defibrated in the gap G between the rotator 160 and the plate materials 156.

3-2. Operation of Defibration Treatment Apparatus

Similar to the first exemplary embodiment, the defibration treatment apparatus 620 of the third exemplary embodiment is provided with the discharge path 121 from the upstream portion (from an upstream end 155A side) in the rotation direction C1 of the defibration inner blades 163 towards the downstream portion (a downstream end 155B side). Furthermore, since the discharge path 121 is disposed outside the position corresponding to the screen 655, the airflow can be oriented towards the discharge opening 124 without the airflow becoming stagnant. Accordingly, stagnation of the defibrated object can be suppressed.

Furthermore, similar to the first and second exemplary embodiments described above, in the present exemplary embodiment as well, the material MA supplied through the feeding hole 192 is defibrated between the fixed member 640, which is a columnar drum, and the rotator 160 (the defibration inner blades 163). The material MA is defibrated in the gap G between the rotator 160 and the plate materials 156. Accordingly, the material MA that has passed the gap G can be defibrated between the plate materials 156 and the defibration inner blades 163. The material MA is defibrated between the fixed member 640, which is a columnar drum, and the defibration inner blades 163 of the rotator 160 until the material MA is defibrated to a size that passes through the classification holes 156a (the openings) provided in the screen 655. Furthermore, the defibrated object that has passed through the classification holes 156a (the openings) of the screen 655 is output to the discharge path 121 provided along the outer circumference of the screen 655. The defibrated object that has been output to the discharge path 121 through the classification holes 156a (openings) of the screen 655 is, as described above, transported towards the discharge opening 124 with the airflow. Furthermore, in the present exemplary embodiment as well, similar to the first and second exemplary embodiments described above, the inner wall surface 180A is formed so that the distance from the screen 155 becomes larger as the inner wall surface 180A extends in the rotation direction C1 of the rotator 160. Accordingly, the bent portion 122 of the discharge path 121 is formed so that a cross-sectional area Sa of the discharge path 121 becomes larger as the discharge path 121 extends downstream in the rotation direction C1. Similar to the second exemplary embodiment, the present exemplary embodiment may also be configured to include an air suction path 238 in the upstream portion of the discharge path 121, which will have an advantageous effect similar to that of the second exemplary embodiment.

As described above, in the defibration treatment apparatus 620 of the present exemplary embodiment, similar to the first exemplary embodiment, the rotator 160 includes the plurality of defibration inner blades 163 that protrude in directions extending away from the rotation shaft 171. Furthermore, the fixed member 640 is configured of the screen 655 including the plurality of classification holes 156a. The screen 655 is disposed at a position corresponding to the outer rotational circumference of the rotator 160. Furthermore, the discharge path 121 that is in communication with the discharge opening 124 is provided along the screen 655 and on a side opposite the rotator 160 with respect to the screen 655. Accordingly, in the present exemplary embodiment as well, similar to the first exemplary embodiment, stagnation of the defibrated object between the rotator 160 and the fixed member 640 can be suppressed.

Figure 7:
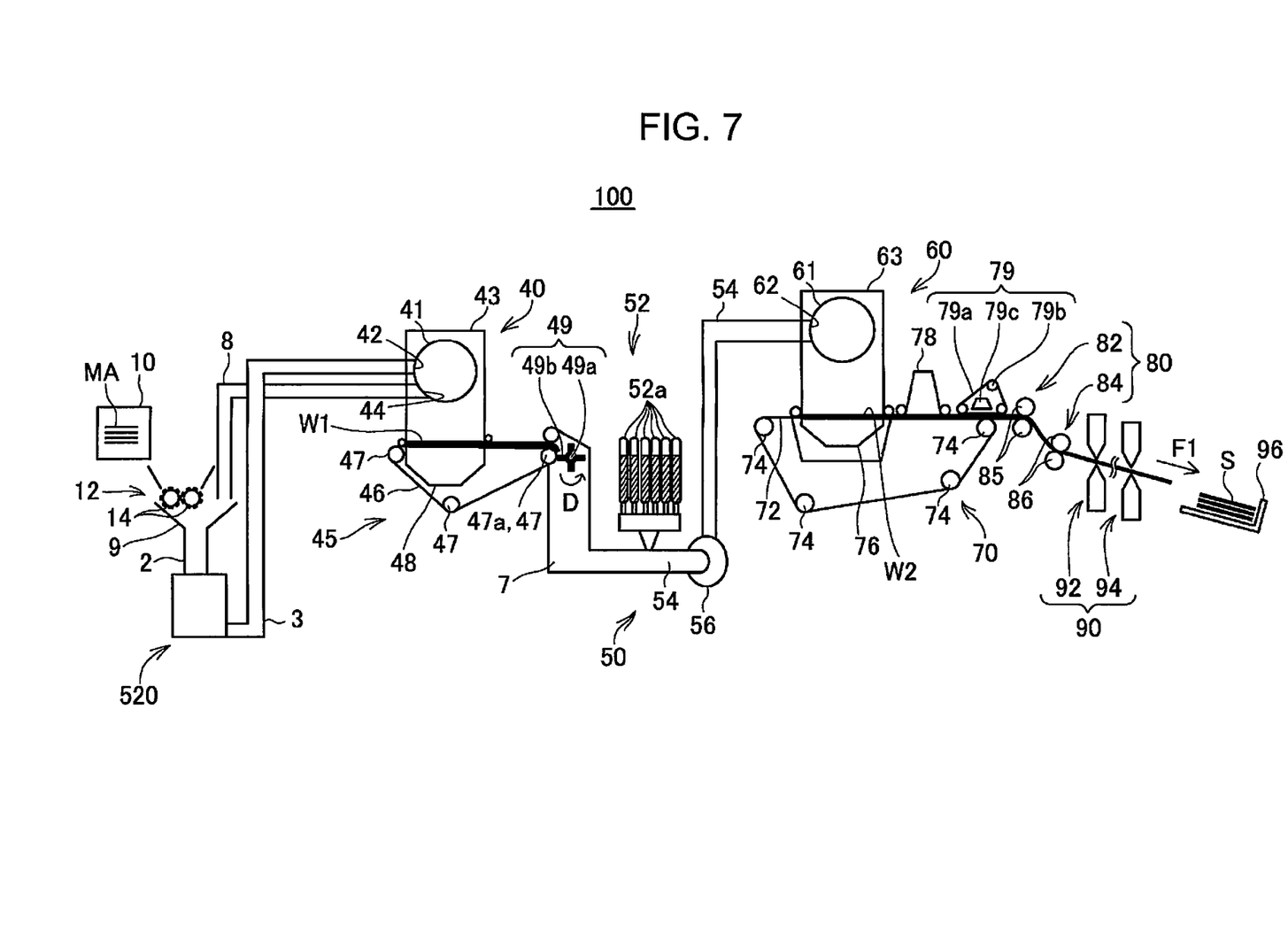
FIG. 7 is a schematic diagram illustrating a configuration of a sheet manufacturing apparatus.

4. Fourth Exemplary Embodiment 4-1. Overall Configuration of Sheet Manufacturing Apparatus FIG. 7 is a schematic diagram illustrating a configuration of a sheet manufacturing apparatus 100. The sheet manufacturing apparatus 100 fiberizes the material MA containing fiber, and performs a reproducing process that reproduces a new sheet S. The sheet manufacturing apparatus 100 corresponds to an example of a fiber processing apparatus.

The sheet manufacturing apparatus 100 includes a storing and supplying portion 10, a shredding portion 12, a defibrating portion 520, a screening portion 40, a first web forming portion 45, a rotator 49, a mixing portion 50, an accumulating portion 60, a second web forming portion 70, a transporting portion 79, a sheet forming portion 80, and a cutting portion 90.

The defibrating portion 520 of the sheet manufacturing apparatus 100 includes the defibration treatment apparatus 20 of the first exemplary embodiment.

The screening portion 40, the first web forming portion 45, the rotator 49, the mixing portion 50, the accumulating portion 60, the second web forming portion 70, the transporting portion 79, the sheet forming portion 80, and the cutting portion 90 each corresponds to a processing portion that processes the defibrated object that has been defibrated by the defibration treatment apparatus.

The storing and supplying portion 10 stores the material MA and is an automatic feeding apparatus that continuously feeds the material MA to the shredding portion 12. The material MA may be any material that contains fiber and is wastepaper, disposed paper, or a pulp sheet, for example.

The shredding portion 12 includes shredding blades 14 that cuts the material MA supplied by the storing and supplying portion 10. The shredding portion 12 cuts the material MA into pieces of a few square centimeters in midair with the shredding blades 14. The shredding portion 12 can use a shredder, for example. The material MA cut by the shredding portion 12 is collected with a hopper 9 and is transported to the feeding hole 192 (see FIG. 2) of the defibrating portion 520 through a pipe 2.

Shredded pieces are transported from the shredding portion 12 to the defibrating portion 520 with the airflow. In the defibrating portion 520, the shredded pieces are fed thereto through the feeding hole 192, and the shredded pieces are defibrated between the rotator 160 and the fixed member 140. The defibrated shredded pieces, or the defibrated object, is output through the discharge opening 124. The defibrated object is transported from the defibrating portion 520, through a pipe 3 coupled to the discharge opening 124 (see FIG. 3), and to the screening portion 40 with the airflow.

The screening portion 40 screens the constituents included in the defibrated object based on fiber size. The screening portion 40 includes a drum portion 41 and a housing portion 43 that houses the drum portion 41. A sieve, for example, is used as the drum portion 41.

The defibrated object introduced into an inner portion of the drum portion 41 through an introduction opening 42 is separated, with the rotation of the drum portion 41, into a passing object that passes through the opening of the drum portion 41 and a remaining object that does not pass through the opening. A first screened object, which is the passing object that has passed through the opening, descends through an inner portion inside the housing portion 43 towards the first web forming portion 45.

Furthermore, a second screened object, which is the remaining object that does not pass through the opening, is resent to the feeding hole 192 of the defibrating portion 520 through a pipe 8 from a discharge opening 44 that is in communication with the inner portion of the drum portion 41.

The first web forming portion 45 includes a mesh belt 46, stretching rollers 47, and a suction portion 48. The mesh belt 46 is an endless belt stretched across the plurality of stretching rollers 47. The mesh belt 46 circulates through a route formed by the stretching rollers 47. A portion of the route of the mesh belt 46 under the drum portion 41 is flat. The mesh belt 46 forms a flat surface. The suction portion 48 corresponds to a suction mechanism.

A plurality of openings are formed in the mesh belt 46. Among the first screened objects that descend from the drum portion 41 positioned above the mesh belt 46, the constituents that are larger than the openings of the mesh belt 46 are accumulated on the mesh belt 46. Furthermore, among the first screened objects, the constituents that are smaller than the openings of the mesh belt 46 pass through the openings.

The suction portion 48 includes a blower (not shown) and suctions the air from a side opposite the drum portion 41 with respect to the mesh belt 46. The constituents that pass through the openings of the mesh belt 46 are suctioned into the suction portion 48. The airflow that is suctioned by the suction portion 48 draws the first screened objects descending from the drum portion 41 to the mesh belt 46, which has an effect of facilitating accumulation of the first screened objects.

The constituents that have accumulated on the mesh belt 46 is formed into a web shape so as to constitute a first web W1. The basic configurations of the mesh belt 46, the stretching rollers 47, and the suction portion 48 are similar to those of a mesh belt 72, the stretching rollers 74, and the suction mechanism 76 of the second web forming portion 70 described later.

As the mesh belt 46 moves, the first web W1 is transported to the rotator 49.

The rotator 49 includes a base portion 49a that is coupled to a drive portion (not shown) of a motor or the like, and a protrusion 49b that protrudes from the base portion 49a. By having the base portion 49a rotate in a D direction, the protrusion 49b is rotated about the base portion 49a.

The rotator 49 is positioned at an end portion of the flat portion in the route of the mesh belt 46. Since the route of the mesh belt 46 bends downwards in the above end portion, the first web W1 transported by the mesh belt 46 protrudes from the mesh belt 46 and comes in contact with the rotator 49. The first web W1 becomes unbound by the protrusion 49b impinging thereon, and the first web W1 becomes small pieces of fibers. The above pieces pass through a pipe 7 positioned under the rotator 49 and are transported to the mixing portion 50.

The mixing portion 50 mixes the first screened object and an additive with each other. The mixing portion 50 includes an additive supplying portion 52 that supplies the additive, a pipe 54 that transports the first screened object and the additive, and a mixing blower 56.

The additive supplying portion 52 supplies the additive formed of fine powder or fine particles inside an additive cartridge 52a to the pipe 54.

The additive supplied from the additive supplying portion 52 contains a resin, or a binding agent, that binds a plurality of fibers to each other. The resin contained in the additive becomes melted when passing through the sheet forming portion 80 and binds the plurality of fibers to each other.

The mixing blower 56 generates airflow in the pipe 54 that couples the pipe 7 and the accumulating portion 60 to each other. Furthermore, the first screened object transported from the pipe 7 to the pipe 54, and the additive supplied to the pipe 54 from the additive supplying portion 52 are mixed when passing through the mixing blower 56.

The accumulating portion 60 unbinds the fibers in the mixture and disperses the fibers in the air while the fibers descend to the second web forming portion 70.

The accumulating portion 60 includes a drum portion 61 and a housing portion 63 that houses the drum portion 61. For example, the drum portion 61 is a cylindrical structure configured in a manner similar to the drum portion 41, is rotated by motive power of a motor (not shown) in a manner similar to the drum portion 41, and functions as a sieve.

The second web forming portion 70 is disposed under the drum portion 61. The second web forming portion 70 includes, for example, the mesh belt 72, the stretching rollers 74, and the suction mechanism 76.

In the mixture that descends from the drum portion 61 positioned above the mesh belt 72, the constituents that are larger than the openings of the mesh belt 72 are accumulated on the mesh belt 72. The constituents that have accumulated on the mesh belt 72 is formed into a web shape so as to constitute a second web W2.

A humidity control portion 78 is provided downstream of the accumulating portion 60 in the transport path of the mesh belt 72. The moisture amount in the second web W2 is controlled with the moisture supplied by the humidity control portion 78; accordingly, an effect of suppressing adhesion of the fiber to the mesh belt 72 caused by static electricity can be expected.

The second web W2 is peeled off from the mesh belt 72 with the transporting portion 79 and is transported to the sheet forming portion 80. The transporting portion 79 includes, for example, a mesh belt 79a, rollers 79b, and a suction mechanism 79c. The suction mechanism 79c includes a blower (not shown) and generates an upwards airflow through the mesh belt 79a with suction force of the blower. The second web W2 is separated from the mesh belt 72 with the above airflow and is attached to the mesh belt 79a. The mesh belt 79a is moved by the rotation of the rollers 79b and transports the second web W2 to the sheet forming portion 80.

The mesh belt 79a can be configured of an endless belt including openings in a manner similar to the mesh belt 46 and the mesh belt 72.

By adding heat to the second web W2, the sheet forming portion 80 binds the fibers included in the second web W2 derived from the first screened object with the resin included in the additive.

The sheet forming portion 80 includes a compressing portion 82 that compresses the second web W2, and a heating portion 84 that heats the second web W2 compressed by the compressing portion 82. The compressing portion 82 compresses the second web W2 at a predetermined nip pressure with calender rollers 85 and 85 and transports the second web W2 towards the heating portion 84. The heating portion 84 pinches and applies heat to the second web W2 that has been highly densified with a pair of heating rollers 86 and 86, and transports the second web W2 to the cutting portion 90. The resin included in the second web W2 is heated at the heating portion 84 and the second web W2 becomes a sheet S.

The cutting portion 90 cuts the sheet S formed at the sheet forming portion 80. The cutting portion 90 includes a first cutting portion 92 that cuts the sheet S in a direction intersecting the transport direction of the sheet S depicted by a reference numeral F1 in the drawing, and a second cutting portion 94 that cuts the sheet S in a direction parallel to the transport direction F1. The cutting portion 90 cuts the sheet S into a length and a width of a predetermined size so as to form cut-form sheets S. The sheets S cut in the cutting portion 90 is stored in a discharge portion 96.

As described above, the sheet manufacturing apparatus 100 of the present exemplary embodiment includes the defibrating portion 520, the screening portion 40 that performs a treatment on the defibrated object defibrated in the defibrating portion 520, the first web forming portion 45, the rotator 49, and the mixing portion 50. The sheet manufacturing apparatus 100 of the present exemplary embodiment further includes the accumulating portion 60, the second web forming portion 70, the transporting portion 79, the sheet forming portion 80, and the cutting portion 90.

In the sheet manufacturing apparatus 100 of the present exemplary embodiment, since the discharge path 121 is provided in the defibrating portion 520 in a direction downstream of the rotation of the defibration inner blades 163 (see FIG. 3), the airflow does not become stagnated and can be oriented towards the discharge opening 124; accordingly, stagnation in the airflow can be prevented from occurring. Accordingly, since the defibrated object is supplied in a continuous and stable manner to the screening portion 40 that performs treatment on the defibrated object defibrated in the defibrating portion 520, the treatment of the fibers of the defibrated object becomes stable and a uniform sheet S can be obtained. The sheet S corresponds to an example of a fiber treated object.

The defibrating portion 520 can be configured of either one of the defibration treatment apparatuses 220 and 620 of the second and third exemplary embodiment in place of the defibration treatment apparatus 20 of the first exemplary embodiment.

What is claimed is:

1. A defibration treatment apparatus comprising:
    a feeding hole through which a material is fed;
    a rotator that rotates about a rotational central axis and performs a dry defibration treatment on the material which has been fed through the feeding hole, the rotator including a plurality of rotary blades that extend in directions away from the rotational central axis;
    a fixed member that covers at least a portion of the rotator, at least a portion of the fixed member being configured of a screen including a plurality of openings, the screen being disposed at a position corresponding to an outer rotational circumference of the rotator;
    a discharge opening that discharges a defibrated object obtained by defibrating the material between the rotator and the fixed member; and
    a discharge path part in communication with the discharge opening, the discharge path part being provided along the screen and on a side opposite the rotator with respect to the screen the discharge path part including a bent portion that extends along an outer circumferential portion of the screen, the bent portion having a cross-sectional area that becomes larger as the bent portion approaches the discharge opening.

2. The defibration treatment apparatus according to claim 1, further comprising an air suction path part that is configured to take in a gas and to which the discharge path is, at a position away from the discharge opening, coupled.

3. The defibration treatment apparatus according to claim 2, further comprising an air sending device that sends a gas from the air suction path part to the discharge path part and is coupled to the air suction path part.

4. The defibration treatment apparatus according to claim 1, wherein
    the discharge path part has an arc shape so as to surround the screen.

5. A fiber processing apparatus comprising:
    the defibration treatment apparatus according to claim 1; and
    a processing portion that processes the defibrated object that has been obtained by defibrating the material in the defibration treatment apparatus.

* * * * *